United States Patent [19]

Cecchin et al.

[11] 4,177,160

[45] Dec. 4, 1979

[54] CATALYTIC COMPONENTS AND CATALYSTS FOR THE POLYMERIZATION OF OLEFINS

[75] Inventors: Giuliano Cecchin; Luciano Luciani; Pier Luigi Griselli, all of Ferrara, Italy

[73] Assignee: Montedison S.p.A., Milan, Italy

[21] Appl. No.: 960,664

[22] Filed: Nov. 14, 1978

Related U.S. Application Data

[63] Continuation of Ser. No. 712,306, Aug. 6, 1976, abandoned.

[30] Foreign Application Priority Data

Aug. 8, 1975 [IT] Italy ............................... 26231 A/75

[51] Int. Cl.² .............................................. C08F 4/64
[52] U.S. Cl. ................................. 252/429 B; 526/142

[58] Field of Search ............... 252/429 B, 441, 429 A; 423/492

[56] References Cited

U.S. PATENT DOCUMENTS

| | | | |
|---|---|---|---|
| 3,669,948 | 6/1972 | Konotsune et al. | 252/429 B X |
| 3,984,350 | 10/1976 | Karayannis et al. | 252/429 B |
| 4,007,133 | 2/1977 | Rust et al. | 252/429 B |

*Primary Examiner*—Patrick Garvin

[57] ABSTRACT

There are disclosed new catalysts for the stereospecific polymerization of alpha-olefins having the formula $CH_2=CHR$ in which R is an alkyl radical containing from 1 to 4 carbon atoms and the starting components of which comprise (a) a halogenated organometallic Al compound and (b) reduction products of $TiCl_4$ comprising $TiCl_3$ in the crystalline beta form.

8 Claims, No Drawings

CATALYTIC COMPONENTS AND CATALYSTS FOR THE POLYMERIZATION OF OLEFINS

This is a continuation of application Ser. No. 712,306 filed Aug. 6, 1976 and now abandoned.

THE PRIOR ART

It is known, from Italian Pat. No. 558,925, to polymerize olefins in contact with catalysts prepared from reduction products of $TiCl_4$ and alkyl Al compounds or from organometallic Al halides. As is also known, the reaction between $TiCl_4$ and alkyl Al halides can be controlled to result in a product in which, in the Ti halide, the Ti is substantially present in trivalent form, i.e., as $TiCl_3$.

It is also known that, to obtain catalysts which are both highly active and highly stereospecific in the polymerization of the alpha-olefins, it has been necessary for the reduction product of $TiCl_4$ to comprise $TiCl_3$ in the crystalline delta form.

The delta crystalline form of $TiCl_3$ may be obtained directly during the course of the $TiCl_4$ reduction, by using, for instance, $AlEtCl_2$ as the reducing agent and by operating at relatively low temperatures, or by heating the reduction products in which $TiCl_3$ is present in the beta form at temperatures in general greater than 130° C.

Even when the superficial area of the catalytic components containing delta $TiCl_3$ is very high (80–100 $m^2/g$), the activity of the catalysts derived from them is not very satisfactory. The poor activity has been imputed to the presence of aluminum compounds, such as, for instance, aluminum alkyl dihalides, in the reduction product.

In order to overcome this drawback it has been suggested to treat the reduction product with Lewis bases, for instance with ethers (U.S. Pat. No. 3,825,524 and British Pat. No. 1,139,450).

In U.S. Pat. No. 3,825,524, the treatment with Lewis bases is preferably carried out on the $TiCl_3$ in the crystalline delta form.

When the treatment is carried out on $TiCl_3$ in the crystalline beta form, or when the $TiCl_3$ is already in the delta form but has not been activated by heating at 140°–150° C., the stereospecificity of the catalyst is not very high.

In general, the $TiCl_4$ reduction products containing $TiCl_3$ in the delta form and treated with ethers are of the following composition:

wherein:
R is a hydrocarbon radical;
X is halogen;
m is a number comprised between 0 and 2;
a, which defines the mols of aluminum compound per mols of $TiCl_3$, is lower than 0.3;
A is an ether, and finally
p, which defines the mols of ether per mols of $TiCl_3$, is greater than 0.001.

The superficial area of these products is in general greater than 50–60 $m^2/g$ and the porosity is greater than 0.1 $cm^3/g$.

Quite recently it has been suggested to treat with ethers as well as with $TiCl_4$, the $TiCl_4$ reduction product with alkyl aluminum halides (Italian Pat. No. 950,499).

The catalysts that are obtained from these catalytic components have good activity and stereospecificity.

For a good performance of the catalyst, it is essential that the catalytic components have a superficial area greater than 75 sq.mt/g and a porosity greater than 0.15 cc/g and that the $TiCl_3$ be in the crystalline delta form.

THE PRESENT INVENTION

One object of this invention is to provide new catalyst components, and new catalysts comprising the same, based on products obtained by reducing $TiCl_4$ with halogenated organo-metallic aluminum compounds, suitably treated, and which exhibit both good activity and high stereospecificity in the polymerization of alpha-olefins of formula $CH_2=CHR$, in which R is an alkyl radical containing from 1 to 4 carbon atoms, even when the superficial (surface) area of said products is considerably lower than 75 $m^2/g$, the porosity is lower than 6.15 cc/g, and, on X-rays examination, the products give a spectrum which shows the main diffraction lines which are characteristic of $TiCl_3$ in the crystalline beta form.

Surprisingly, and contrary to all expectations, we have found that catalysts based on the new components having the aforesaid characteristics, and which exhibit the good activity and high stereospecificity in the polymerization of the alpha-olefins, when said catalyst-forming components are prepared under the conditions described infra.

The new catalyst-forming components comprising $TiCl_3$ of this invention are characterized in that, in the X-rays spectrum thereof, there appear the following diffraction lines at the inter-lattice distances: d=5.4 Å (intense line); d=2.75 Å line of medium intensity) and d=2.12 Å (line of medium-weak intensity); d=1.98 Å (very weak line); and d=1.77 Å (medium intensity line).

The first four diffraction lines aforesaid are characteristic of $TiCl_3$ in the beta form; the line d=1.77 Å, together with other lines, characterizes a new form of $TiCl_3$.

The complete X-rays spectrum of beta $TiCl_3$ was described by Natta et al in "Atti Accademia dei Lincei", 24,8, 121–129 (1958).

The new catalyst-forming components of this invention consist of, or comprise, products of the composition:

wherein:
R is a hydrocarbon radical containing from 1 to 20, but preferably form 2 to 10 carbon atoms, and in particular: alkyl, aryl, cycloalkyl, alkylaryl and aralkyl; $0 \leq m \leq 2.5$;
X is a halogen;
a is a number lower than 0.4 but preferably lower than 0.2;
A is a mol of a monoether or polyether, capable of forming, with the aluminum or alkyl aluminum halides coordination complexes or compounds soluble in at least one of the solvents chosen from amongst the mono- and poly-ethers, aromatic and aliphatic hydrocarbons, and their halogenated derivatives; and
p is equal to, or greater than, zero and lower than 0.5, and in general is comprised between 0.001 and 0.5.

The superficial area of the catalytic components of this invention is comprised between 1 and 50 sq.mt/g, and in particular between 2 and 20 sq.mt/g. The porosity is lower than 0.1 cc/g and more particularly it is comprised between 0.05 and 0.001 cc/g.

The surprising feature of these new catalyst-forming components is that the catalysts obtained from them promote the stereoregular polymerization of the alpha-olefins (in particular of propylene), not withstanding the fact that in their X-ray spectrum there appear the lines characteristic of beta-$TiCl_3$ which notoriously does not give catalysts which promote the stereoregular polymerization of alpha-olefins. Unexpectedly, the catalysts obtained from the new catalyst-forming components of this invention, besides being highly stereospecific, also exhibit a high activity.

The new catalyst-forming components of this invention are prepared by a process which is also an object of the invention and which involves the following phases in the order given:

(1) the reduction of $TiCl_4$ with organometal compounds of aluminum having the formula $AlRX_2$, $AlR_2X$ or $Al_2R_3X_3$, wherein R and X have the same meaning as in formula (I);

(2) possibly, but not necessarily, the thermal pretreatment of the reduction product at a temperature comprised between 20° C. and 100° C., for times that depend on the temperature and which are comprised between 10 minutes and 5 hours;

(3) the treatment of the reduction product with a mono-poly-ether as defined herein, carried out at a temperature comprised between 70° and 120° C.; and, finally, (4) washing of the product obtained in phase (3) with an inert hydrocarbon solvent.

It can be preferable, between phases 2 and 3, to carry out an intermediate operation according to which the reduction product, possibly thermally pre-treated, is additioned with a certain quantity of an aluminum alkyl compound, for instance $Al(C_2H_5)_2Cl$, and then with propylene (or other olefin) for instance with 0.2–1 g of propylene per g of catalytic compound, for improvement in the granulometry and apparent density of the polymer.

1st phase (reduction of $TiCl_4$)

The $TiCl_4$ is reduced with organometallic aluminum compounds of formula $AlRX_2$, $AlR_2X$ or $Al_2R_3X_3$, wherein R is a hydrocarbon radical containing from 2 to 10 carbon atoms and more particularly an alkyl such as ethyl, propyl, butyl, etc., and wherein X is a halogen, preferably chlorine. Examples typical of such aluminum compounds are: $AlC_2H_5Cl_2$, $AlC_3H_7Cl_2$, $Al_2(C_2H_5)_3Cl_3$, $Al_2(C_3H_7)_3Cl_3$, $Al(C_2H_5)_2Cl$ and $Al(C_3H_7)_2Cl$. The reduction of $TiCl_4$ is preferably carried out in liquid hydrocarbon media under the reaction conditions. The reduction temperature depends on the type of the organometallic aluminum compound used as reducing agent.

More particularly, in the case of aluminum alkyl sesquichlorides or monochlorides, the reduction is preferably carried out at temperatures comprised between $-10°$ C. and $+20°$ C. and particularly between 0° C. and $+10°$ C. If the Al compound is an alkyl aluminum dichloride, the reduction is preferably carried out at temperatures between 0° C. and 40° C. and more particularly between 10° C. and 30° C.

The Al/Ti ratio varies from 0.1 to 5 and is preferably comprised between 0.5 and 2.

At the end of the reaction, the solid product may be separated from the liquid phase and washed with a hydrocarbon solvent. The solid product thus obtained contains, in general, for each mol of $TiCl_3$, from 0.1 to 1 mol of orgnometallic aluminum compound.

2nd phase (thermal pre-treatment)

The solid reduction product of phase (1) may be subjected to a thermal pretreatment at temperatures comprised between 20° C. and 100° C., but preferably between 60° C. and 90° C. This thermal pre-treatment is usually realized by maintaining the reduced solid in suspension in a hydrocarbon solvent, preferably of the same type of that used in the reducing phase. At the end of the thermal treatment, the solid may be repeatedly washed with a hydrocarbon solvent.

3rd phase (treatment with ethers)

The solid reduction product, possibly thermally pretreated according to phase (2), is reacted with either a mono-ether or a poly-ether capable of forming with aluminum or aluminum alkyl halides co-ordination complexes or compounds that are soluble in at least one of the following solvents: the mono-ether or polyether itself, the aromatic and aliphatic hydrocarbons and their halogenated derivatives. Any mono- or poly-ether, capable of forming with the aluminum or aluminum alkyl halides, coordination complexes or compounds, with the solubility characteristics herein above defined, may be used.

More particularly, the ethers may be chosen from amongst the monoethers of formula R' OR", wherein R' and R", equal to or different from each other, are alkyls containing from 1 to 10, but preferably from 4 to 6 carbon atoms, aryls, cycloalkyls, alkylaryls and aralkyls, and also chosen from amongst polyethers such as diethylenglycol-dimethylether, 1,2-diphenoxy-ethane and the like. Particularly good results are obtained with di-n-butylether and di-isoamylether.

The molar ratio ether/Ti is comprised, in general, between 0.5 and 2.5, and more particularly between 0.8 and 1.5, the temperature of the reaction being comprised between 70° C. and 120° C., preferably between 80° C. and 100° C.

The new catalysts of the invention are obtained by mixing starting components which comprise (a) organometallic Al compounds, such as Al trialkyls or their complexes with electron-donor compounds; or alkyl Al halides such as dialkyl Al chlorides and alkyl Al sesquichlorides, and the new catalyst-forming components of the invention which consist of or comprise products of formula (I) as defined herein.

The catalysts are useful in the polymerization of olefins in general but particularly for promoting the stereoregular polymerization of alpha-olefins of formula $CH_2=CHR$ in which R is an alkyl radical containing 1–4 carbon atoms, including propylene, butene-1, 4-methylpentene-1, mixtures thereof, and mixtures thereof with ethylene, to high yields of crystalline homopolymers or copolymers.

The catalysts obtained from alkyl aluminum halides, and in particular from alkyl Al monohalides are particularly adapted for use in the polymerization of propylene and of its mixtures with ethylene, in as much as they "steer" or orient the polymerization to the production of polymers having a high isotacticity index (percent by weight of polymer insoluble in boiling n-heptane).

When mixtures of ethylene and propylene are polymerized in contact with these catalysts, the content of polymerized ethylene units in the polymerization product may amount to up to 30% b.w.

The polymerization conditions are those which are known in the art and comprise temperatures in general between 0° C. and 100° C. but preferably between 40° and 90° C. with partial pressures of the olefins equal to or greater than atmospheric pressure. The polymerization may be conducted either in a liquid phase, in the presence of an inert hydrocarbon diluent different from the monomer to be polymerized, in the absence of such an extraneous diluent and using liquid monomer, e.g., liquid propylene as the diluent, or in the gas phase.

When the alfa-olefin polymerized is propylene, it is advantageous to effect the polymerization in the presence of an inert liquid aliphatic hydrocarbon diluent or in the presence of liquid propylene as the reaction medium or diluent.

The following examples are given for the purpose of illustrating the invention in more detail and are not to be construed as limiting.

The superfical area data (specific surface) reported in the examples have been determined by means of the liquid nitrogen absorption test (BET method). The porosity (total) has been determined similarly by liquid nitrogen absorption (pores with radius lower than 500 Å).

EXAMPLE 1

Preparation of the new catalytic component

Into a 5 lt reactor there were introduced 2,200 ml of dearomatized n-heptane and 800 g of $TiCl_4$. Thereupon, there were introduced 1,420 ml of a heptanic solution (500 g/lt) of $Al_2Et_3Cl_3$ (molar ratio Al/Ti=1.37). The addition of the aluminum compound was carried out dropwise, maintaining the reaction mass under stirring, within about 90 minutes and by operating at a temperature comprised between 8° and 10° C. The mixture was left to rest, still under stirring at 8°–10° C., for about 4 hours.

The reaction mixture was then brought up to 90° C. and maintained at this temperature for 90 minutes (thermal pretreatment).

The mass was then cooled down to room temperature and washed repeatedly with n-heptane (5 times with 2,000 ml each time).

The solid and thermally pre-treated reduction product (1,000 g) was suspended in 2,500 ml of n-heptane. To the suspension thus obtained were admixed 600 g of di-n-butylether at room temperature (molar ratio ether/Ti ≃ 1.1).

The temperature of the reaction mixture was then brought up to 90° C. and maintained at that temperature for 2 hours. After cooling down to room temperature, the reaction mass was repeatedly washed with n-heptane and, after drying under vacuum at 40° C., there was obtained a brown-colored catalytic component; the X-rays spectrum (CuKα) showed the following characteristic diffraction lines:
 d=5.4 Å (intense line)
 d=2.75 Å (medium intense line)
 d=2.12 Å (line of medium intensity)
 d=1.98 Å (very weak line)
 d=1.77 Å (medium line).
The component was further characterized by:
 Surface area—13.02 sq.mt/g
 Porosity—0.085 cc/g The elementary analysis yielded the following results:
 Ti—24.45% by weight
 Al—0.35 by weight
 Cl—55.9% by weight
 n-butyl ether—4.8% by weight

Polymerization of propylene in n-heptane

Into an autoclave of 2.5 lt holding capacity, made of stainless steel, were introduced 1,000 ml of n-heptane, 0.15 g of the solid catalytic component prepared as described above, and 1.5 g of $AlEt_2Cl$. The polymerization was conducted at 70° C. under a pressure of 5 atm (gauge pressure atm) with propylene and hydrogen (1.5% by volume in the gaseous phase) for 4 hours. The pressure was maintained constant by the continuous feeding in of propylene.

At the end, after removal of the n-heptane by stripping with vapor, there was obtained polypropylene which, on extraction with boiling n-heptane left a heptane-insoluble residue (isotactic polypropylene) amounting to 97% in a yield of 114 g of polymer/g of catalyic complex/hr/ata of propylene.

When Example 1 was repeated, but carrying out the thermal pre-treatment at temperatures greater than 100° C., there were obtained catalytic components in which the $TiCl_3$ showed, under X-rays examination, a spectrum of the delta type. More particularly, if the pre-activation is carried out at 130° C. for 90 minutes and in the treatment with ether the $TiCl_3$/ether ratio is 2:1, there is obtained a catalytic component in which $TiCl_3$ is in the delta-type crystalline form, with a surface area of 132 $m^2/g$ and a porosity of 0.16 cc/g.

The elementary analysis of the thermally pretreated product gave the following results:
 Ti—22.15% by weight
 Al—2.95% by weight
 Cl—54.9% by weight
 Ether—4.5% by weight This catalytic component, used in the polymerization of propylene in n-heptane under the previously described conditions, resulted in a polypropylene which on extraction with boiling n-heptane gave a residue of 94%; the yield was 65 g polymer/g catalytic component/hr/ata of propylene.

If, on the contrary, the ratio by weight $TiCl_4$ reduction product/ether amounts to 4:1, the catalytic component obtained is similar to the preceding one and, when used in the polymerization of propylene under the previously described conditions, results in a polypropylene which, on extraction with boiling n-heptane leaves a heptane-insoluble residue (isotactic polypropylene) amounting to 90%, in a yield of 46.5 g of polymer to one gram of catalytic component x hour x ata propylene.

These comparative data clearly demonstrate the superiorty of the catalysts obtained from the catalytic components according to the invention, particularly with regard to the yields.

EXAMPLE 2

Example 1 was repeated, but without the thermal pretreatment at 90° C. for 90 minutes. Thereby was obtained a solid catalytic component characterized by the following properties:
 Spectrum under X-rays—there appear the lines observed in the component of Example 1
 Surface area—2.85 sq.mt/g
 Porosity—0.06 cc/g The elementary analysis gave the following results:
Ti—24.4% by weight
Al—0.4% by weight
Cl—56.4% by weight
n-butyl-ether—5.0% by weight Said catalytic complex was used in the polymerization of propylene in n-heptane under the reaction conditions of Example 1. A polypropylene having a residue, on extraction with boiling n-heptane, of 95.5% and a yield of 98.8 g polymer/g of catalytic component/hr/ata of propylene was obtained.

EXAMPLE 3

Example 1 was repeated, using AlEt$_2$Cl as the reducing agent instead of Al$_2$Et$_3$Cl$_3$. The reduction was carried out with a molar ratio Al/Ti=1.1:1.

The admixture of aluminum compound was effected dropwise, maintaining the reaction mass under stirring for about 90 minutes while operating at 0° C.

The reaction mixture was left to rest, still under stirring, at 0° C. for about 4 hours. The mixture was then brought up to 60° C. and maintained at that temperature for 90 minutes.

Proceeding as described in Example 1, there was obtained a crystalline solid that showed the following characteristics:
Surface area—7.38 sq.mt/g
Porosity—0.06 cc/g
X-rays spectrum—there are present the lines observed in the component of Example 1.
The elementary analysis gave the following results:
Ti—24.95% by weight
Al—0.95% by weight
Cl—55.45% by weight
n-butyl-ether—4.5% by weight This catalytic component, used in the polymerization of propylene in n-heptane under the conditions of Example 1 led to a polypropylene which on extraction with boiling n-heptane, left a heptane-insoluble residue equal to 92.5%. The yield was 89 g of polymer/g of catalytic component/hour/ata of propylene.

EXAMPLE 4

Example 1 was repeated but using AlEtCl$_2$ as a reducing agent for TiCl$_4$ with a molar ratio Al/Ti of 1.5:1. The addition of aluminum compound was effected dropwise, maintaining the reaction mass under stirring, for 90 minutes and operating at a temperature of 20° C. This reaction mixture was then left to rest, still under stirring, for 4 hours at 20° C.

Without any thermal pre-treatment, the reduction product, after washing, was treated with ether under the conditions of Example 1. The catalytic component thus obtained had the following characteristics:
X-ray spectrum—there appeared the lines observed in the component of Example 1
Surface area—3.25 sg.mt/g
Porosity—0.019 cc/g
The elementary analysis gave the following results:
Ti—23.40% by weight
Al—1.35% by weight
Cl—60.85% by weight
n-butyl-ether—4.6% by weight This catalytic component, used in the polymerization of propylene in n-heptane under the conditions of Example 1, resulted in a polypropylene which on extraction with boiling n-heptane left a solid residue equal to 95.5%. The yield was 90 g of polymer/g of catalytic component/hour/ata of propylene.

EXAMPLE 5

Example 1 was repeated except that the treatment with ether was carried out at 70° C. for 2 hours. The catalytic component thus obtained had the following characteristics:
X-rays spectrum—there appeared the lines observed in the component of Example 1
Surface area—10.5 sq.mt/g
Porosity—0.07 cc/g
The elementary analysis gave the following results:
Ti—24.56% by weight
Al—0.52% by weight
Cl—56.8% by weight
n-butyl ether—4.7% by weight This catalytic component, used in the polymerization of propylene in n-heptane under the conditions of Example 1, led to a polypropylene which, on extraction with boiling n-heptane, left a residue of 91.5%; the yield was 96 g of polymer/g of catalytic component/hour/ata of propylene.

EXAMPLE 6

Example 1 was repeated but carrying out the treatment with ether at 120° C. for 2 hours. The catalytic component thus obtained had the following characteristics:
X-rays spectrum—there appeared the lines observed in the component of Example 1
Surface area—14.5 sq.mt/g
Porosity—0.08 cc/g
The elementary analysis gave the following results:
Ti—24.8% by weight
Al—0.48% by weight
Cl—55.5% by weight
n-butyl ether—4.3% by weight Said catalytic component, used in the polymerization of propylene in n-heptane under the conditions of Example 1, resulted in a polypropylene which, on extraction with boiling n-heptane left a residue of 90%. The yield was 90 g of polymer/g of component/hour/ata of propylene.

EXAMPLE 7

Example 1 was repeated but, after the thermal treatment, the pre-polymerization of propylene in n-heptane was carried out under the following conditions:
Catalytic component—50 g
Al(C$_2$H$_5$)$_2$Cl—25 g
n-heptane—200 ml
Propylene—40 g
Temperature—25°–35° C.

After the pre-polymerization, the catalytic component was subjected to treatment with ether under the conditions described in Example 1; the component had the following properties:
X-rays spectrum—there appear the lines observed in the component of Example 1
Surface area—2 sq.mt/g
Porosity—0.021 cc/g
The elementary analysis gave the following results:
Ti—13.40% by weight
Al—0.25% by weight
Cl—32.2% by weight
Polypropylene—50.0% by weight.

Said catalytic component, used in the polymerization of propylene under the conditions of Example 1, resulted in a polypropylene which, on extraction with boiling n-heptane, left a heptane-insoluble residue of 96%; the yield was 55 g of polypropylene/g of catalytic component/hour/ata of propylene.

If one takes into consideration the fact that the catalytic component contains 50% of polypropylene, the yield with respect to the $TiCl_3$ amounts of 110 g of polypropylene/g of catalytic component ($TiCl_3$)/hour-/ata of propylene.

What we claim is:

1. Catalyst-forming components for use in preparing catalysts for polymerization of olefins, said components consisting of a product of the following composition:

$$TiCl_3 \cdot (AlR_m X_{3-m})_a A_p$$

wherein:

R is a hydrocarbon radical containing from 1 to 20 carbon atoms;

$0 \leq m \leq 2.5$;

X is halogen;

a is a number lower than 0.4;

A is an ether selected from the group consisting of monoethers of formula R'OR" wherein R' and R" are alkyls containing from 1 to 10 carbon atoms, aryls, cycloalkyls, alkylaryls or aralkyls, and polyethers of the class of polyalkylenglycol-dialkyl-ethers and 1,2-diphenoxyehtane, said ether being capable of forming complexes or coordination products with Al halides or alkyl-Al halides, which complexes or coordination products are soluble in the ether itself or in aromatic or aliphatic hydrocarbons or in the halogenated derivatives thereof; and p is zero or a number greater than zero but lower than 0.5 and said catalyst-forming components being characterized in that, in the X-rays spectrum thereof, diffraction lines apper at the following lattice distances:

$d = 5.4$ Å (intense line); $d = 2.75$ Å (line of medium intensity);

$d = 2.12$ Å (line of medium to weak intensity);

$d = 1.98$ Å (very weak line); $d = 1.77$ Å (medium line), and in that the surface area thereof is comprised between 2 and 20 m²/g and the porosity is lower than 0.1 cc/g.

2. The product of claim 1, further characterized in being prepared by the following steps, in the order stated:

(I) reduction of $TiCl_4$ by an organometallic compound of Al having the formula $AlRX_2$, $AlR_2X$ or $Al_2R_3X_3$ in which R is a hydrocarbon radical containing from 1 to 20 carbon atoms and X is halogen, the quantity of Al compound being such that the molar ratio Al/Ti is comprised between 1:1 to 1:5, (II) treatment of the reduction product of step (I), with the mono- or poly-ether defined in claim 1, at a temperature comprised between 70° C. and 120° C; and (III) washing of the product of step (II) with an inert hydrocarbon solvent.

3. The product of claim 1, further characterized in being prepared by the following steps, in the order stated:

(I) reduction of $TiCl_4$ by an organometallic compound of Al having the formula $AlRX_2$, $AlR_2X$ or $Al_2R_3X_3$, in which R is a hydrocarbon radical containing from 1 to 20 carbon atoms and X is halogen, the quantity of Al compound being such that the molar ratio Al/Ti is comprised between 1:1 and 1:5;

(II) thermal pretreatment of the reduction product of step (I) at a temperature comprised between 60° C. and 90° C. for a time varying with the temperature and comprised between 10 minutes and 5 hours;

(III) treatment of the reduction product of step (I), thermally pretreated according to step (II), with the mono- or poly-ether defined in claim 1, at a temperature comprised between 70° C. and 120° C.; and (IV) washing of the product of step (III) with an inert hydrocarbon solvent.

4. The product of claim 1, further characterized in being prepared by the following steps, in the order stated:

(I) reduction of $TiCl_4$ by an organometallic compound of Al having the formula $AlRCl_2$ in which R is a hydrocarbon radical containing from 1 to 20 carbon atoms, at a temperature comprised between 10° and 30° C.;

(II) treatment of the reduction product of step (I), with the mono- or poly-ether defined in claim 1, at a temperature comprised between 70° and 120° C.; and (III) washing of the product of step (II) with an inert hydrocarbon solvent.

5. Catalyst-forming components according to claim 1, further characterized in that:

R is an alkyl, aryl, cycloalkyl, alkylaryl or aralkyl radical;

a is a number lower than 0.2; and p is a number comprised between 0.001 and 0.5.

6. Catalyst-forming components according to claim 1, in which, in the formula R'OR", R' and R", which are the same or different, are alkyl radicals containing from 4 to 6 carbon atoms.

7. Catalyst-forming components according to claim 1, characterized in that the monoether is di-n-butylether or di-iso-amylether.

8. Catalysts for the stereoregular polymerization of alpha-olefins of the formula $CH_2=CHR$ wherein R is an alkyl radical containing from 1 to 4 carbon atoms, obtained by bringing into contact starting components comprising (a) dialkyl aluminum halides or alkyl aluminum sesquihalides with (b) catalyst-forming components as defined in claim 1.

* * * * *